(No Model.)  2 Sheets—Sheet 1.
R. H. BENTON.
VALVE RESEATING MACHINE.
No. 581,571.   Patented Apr. 27, 1897.
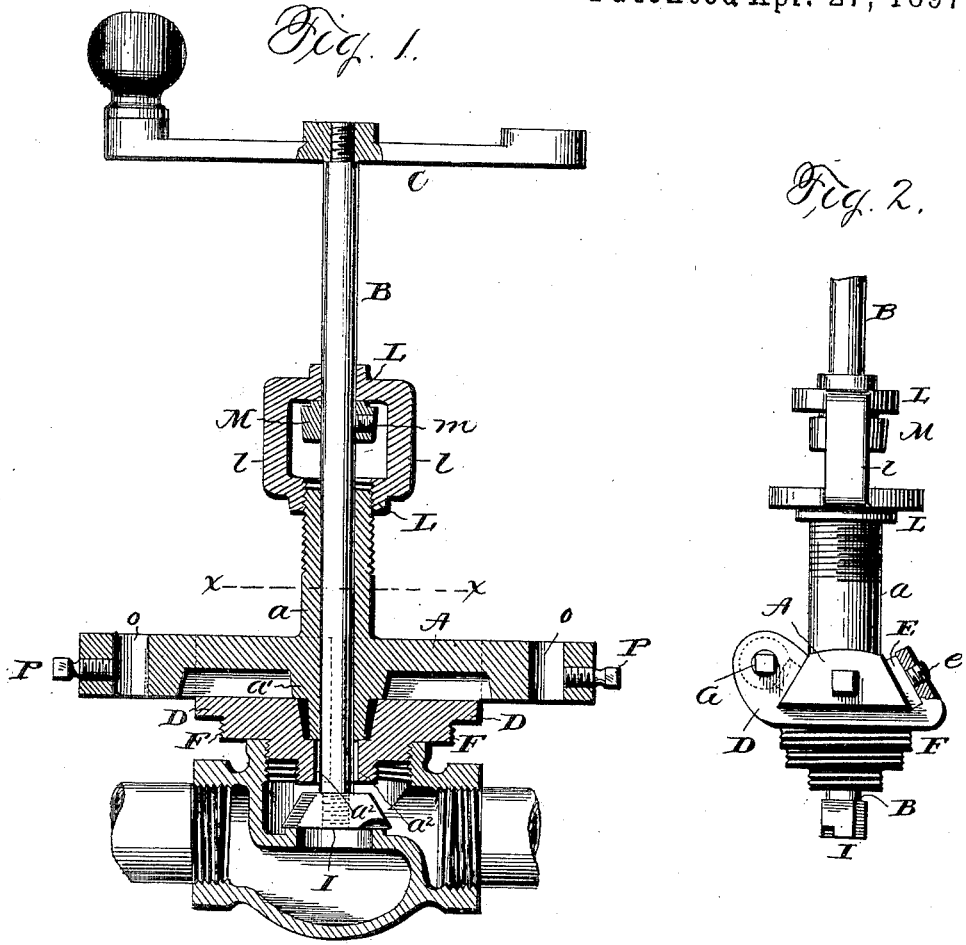
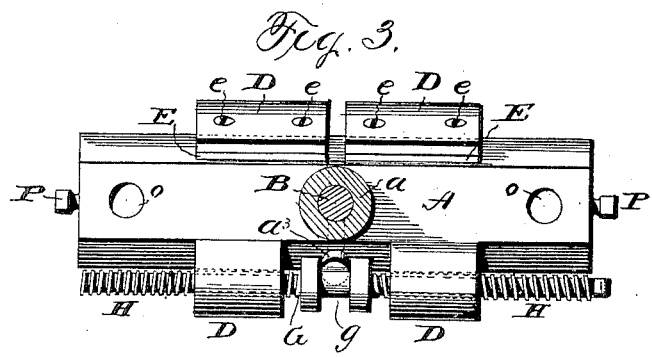
Witnesses
D. L. Andrews
Jas. L. White
Inventor
Royal H. Benton,
by Grove & Co., his Attys (No Model.) 2 Sheets—Sheet 2.
R. H. BENTON.
VALVE RESEATING MACHINE.
No. 581,571. Patented Apr. 27, 1897.
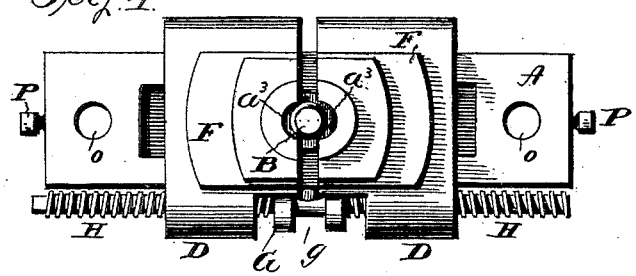
Fig. 4.
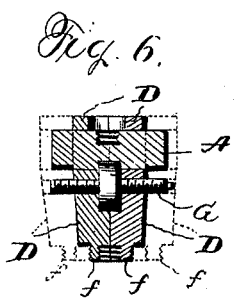
Fig. 6.
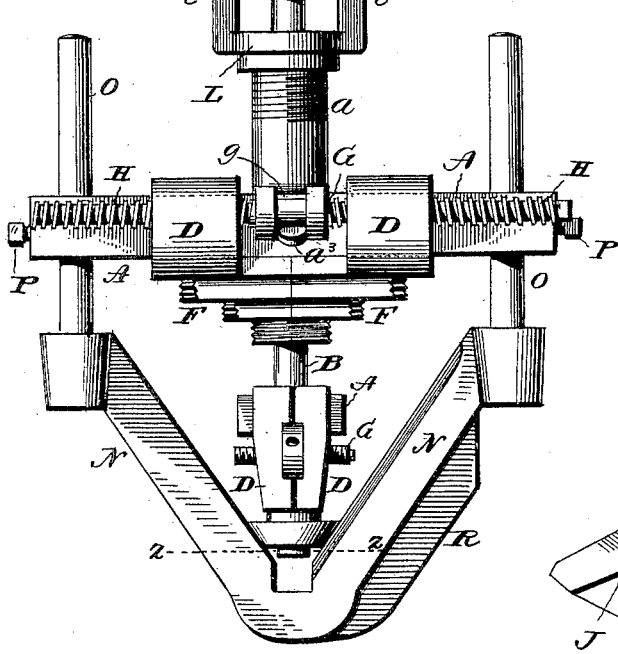
Fig. 5.
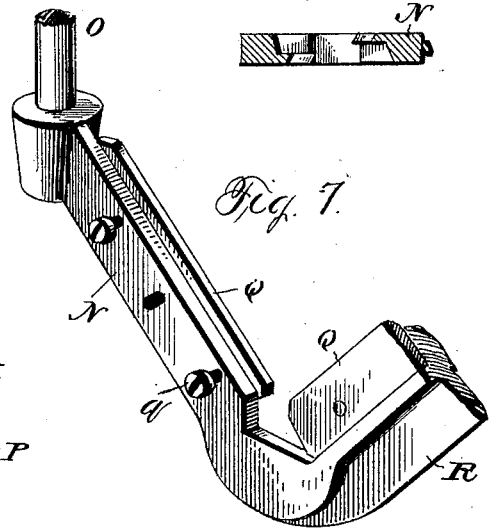
Fig. 7.
Fig. 8.
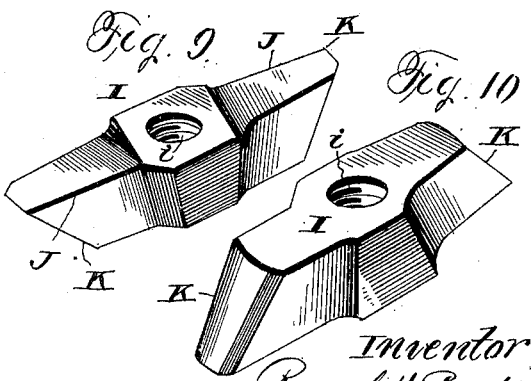
Fig. 9. Fig. 10.
Witnesses
D. L. Andrews.
Jas. T. White.
Inventor
Royal H. Benton
by Grove & Co., his Attys.
THE NORRIS PETERS CO., PHOTO-LITHO., WASHINGTON, D. C.

UNITED STATES PATENT OFFICE.

ROYAL H. BENTON, OF NEW YORK, N. Y.

VALVE-RESEATING MACHINE.

SPECIFICATION forming part of Letters Patent No. 581,571, dated April 27, 1897.

Application filed October 26, 1895. Serial No. 566,985. (No model.)

*To all whom it may concern:*

Be it known that I, ROYAL H. BENTON, a citizen of the United States, residing at New York, in the county of New York and State of New York, have invented certain new and useful Improvements in Valve-Reseating Machines; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to machines for dressing and resurfacing the seats and disks of steam and water valves, faucets, and the like, and has for its object the provision of a machine of this class which will be simple and cheap of construction and yet capable of efficient and thoroughly satisfactory work; and to these ends the invention consists in the machine having the features of construction hereinafter specified and claimed.

In the annexed drawings, Figure 1 is a vertical section of my machine applied to a valve for resurfacing the seat thereof. Fig. 2 is an end view of the machine, as shown in Fig. 1, removed from the valve. Fig. 3 is a horizontal section on the line $x$ $x$ of Fig. 1. Fig. 4 is a bottom view thereof. Fig. 5 is a side view of the machine arranged for dressing a tapering valve-disk; Fig. 6, a detail view of the disk or work-holder shown in Fig. 5; Fig. 7, a detail view of the disk cutting or dressing tool; Fig. 8, a horizontal section on the line $z$ $z$ of Fig. 5. Figs. 9 and 10 are detail views of the seat-cutting tool.

In the drawings, A designates a straight horizontal bar having at its longitudinal center a vertical opening through which passes and in which journals a spindle B, that at its lower end is threaded for connection with a cutting-tool or a work-holder and at its upper end is provided with a detachable crank or handle C, by means of which it may be revolved. To afford an extended bearing for the spindle, the bar A has on its upper side an integral tubular extension $a$ and on its lower side a like but shorter extension $a'$.

The two sides of the bar A are inclined downward and outward, and upon the same are placed two blocks D and D, that are respectively on opposite sides of the spindle B. Said blocks are slidingly connected with the bar by means of a way in the upper side of each that has dovetailed or inclined sides that engage the inclined sides of the bar. Between one of the sides of each block and the adjacent side of the bar I place a gib E, that may be adjusted by means of screws $e$ and $e$, to prevent any looseness of the block whatever on the bar.

Upon the under side of each block is a series of parallel segment-shaped steps F and F, preferably three, receding toward the spindle, and the curved face of each being screw-threaded in correspondence with the threads of valve-casings which said steps are designed to engage. The inner sides of the blocks, below the bar extension $a'$, are each provided with a semicircular cavity $a^2$, of the same diameter as the diameter of the spindle B, so that when the two blocks are brought together the two cavities will inclose and afford a bearing for the spindle at such point.

To simultaneously slide the two blocks along the bar A and to give to both exactly the same amount of movement, I employ a rod or shaft G, placed parallel with the bar and having right-and-left threaded portions H and H, that respectively engage correspondingly-threaded openings in the blocks. One or both ends of the shaft are squared to receive a key or other device to revolve it, and to prevent it moving endwise the shaft is provided at its longitudinal center with a circumferential groove $g$, into which projects a lug or stud $a^3$ on the bar A. By revolving the shaft in one direction the blocks will be simultaneously moved toward each other, while by moving it in the reverse direction they will be moved simultaneously away from each other.

For dressing valve-seats I employ a cutter in the form of a bar I, that has a central threaded opening $i$ by which it may be attached to the lower end of the spindle B, and has two diametrically-extending horizontal cutting edges J and J, for operating on flat seats, and two inclined cutting edges K and K at its ends for work on inclined seats. The cutting edges J are arranged on tangential, not radial lines, to give a draw or sweeping cut, and the edges K are properly inclined for a like reason. Said cutting edges extend in straight lines, and hence they can be easily sharpened, and ample clearance may be given, so that no difficulty from clogging arises even in cutting wet metal. By reversing the position of the cutter-bar on the spindle one pair of cutting edges or the other may be put in working position.

To feed the spindle B downward, I provide a feed-yoke consisting of two disks L and L, that are connected by two vertical arms $l$ and $l$, the upper disk having an opening for the passage of the spindle and the lower disk an interiorly-threaded opening for engaging the externally-threaded upper end of the bar extension $a$. Between the disks there is a collar M on the spindle B, that is adapted to be fixed thereto by a set-screw $m$, and which is engaged and moved downward by the upper disk when the yoke is revolved to feed downward.

The use and operation of my machine for dressing valve-seats are as follows:

A cutter I of suitable size is screwed on the lower end of the spindle B, with the appropriate cutting edges arranged for work according as the seat is flat or inclined, and the lower end of the spindle and such steps of the blocks D and D inserted in the valve as will go therein. The blocks are then moved by the screw-shaft to place such steps thereof in engagement with the valve-casing as nearest approach in width the diameter of the casing-opening. The cutter being on the valve-seat, the dressing is done simply by revolving the spindle and through the feed-yoke feeding it downward as the cutting progresses, and by means of said yoke applying the requisite pressure to the cutter.

It is to be noted that when a pair of steps engages a valve-casing the under sides of the steps next above rest on the top of the casing, thus insuring accurate horizontal adjustment, since the under sides of the steps lie in a plane at a perfect right angle to the spindle, and consequently parallel to the cutting-tool. When the topmost steps engage the interior of the casing, a function such as that just described is performed by the under side of the blocks D.

Each succeeding pair of steps is wider laterally as well as longitudinally than the one below it, and the segment thereof is of a larger circle than the one below, thus giving a wider surface for contact with the valve-casing and giving a stronger connection proportionately for larger valves.

By the described form of slide connection between the blocks D and the bar A any play of the parts by reason of looseness of the connections between the blocks and bar can be absolutely avoided and the blocks and bar held relatively immovable, whatever be the position to which the blocks may be adjusted along the bar.

In Fig. 5 I show my machine arranged for dressing a tapered valve-disk. The latter is secured to a work-holder that is screwed on the lower end of the spindle B in place of the cutter I. Said work-holder has, essentially, the same general construction as the valve-casing-clamping device—that is to say, it has a pair of jaws D and D, slidingly mounted on a bar A and adjustable by a right-and-left threaded shaft G, and each jaw has on its under side a curved projection $f$, threaded interiorly and exteriorly and adapted to engage the threaded projection on the top of the disk.

The cutters for the disk are on the inner opposite edges of a V-shaped bar N, that is supported by two vertical arms O and O, extending from its upper ends, that respectively pass through openings $o$ and $o$ near the ends of the bar A and in which they are secured by set-screws P and P. Said cutters may be formed by milling out the edges of the bar N, but preferably I employ for each a blade Q, that is attached to the bar by means of screws $q$, that pass through slots in said bar and thus permit of adjustment of the cutters.

It will be seen that the use of the bar N as a support for the cutters or blades Q is advantageous in that the latter, by being located, as shown, on the sides of said bar, have their cutting edges presented on lines tangential and not radial to the axis of the valve being ground. The result of this is that the cutting edges do not catch or unduly bite into the valve, and hence objectionable chattering is avoided and a smooth, easy, and free cut is produced. This arrangement also renders possible an ample range of adjustment of the angle of the cutter to suit the inclination desired to be given the side of the valve.

My V-bar, besides being a very light and cheap form of support for the cutters, is of advantage as exposing the work, so that the operator can at all times see exactly how much he is taking off the valve.

To dress or resurface a tapering valve-disk with the machine arranged as just described, the disk is removed from the valve-stem and the work-holder is attached to that part of the disk which screws on the stem by manipulating the screw-shaft until the jaws engage the sides of said part. The set-screw of the spindle-collar M is now released, which allows the spindle to which the work-holder is attached to drop down until the disk rests upon the cutting edges of the dressing-tool. Said collar is then secured to the spindle at a point where it will be engaged by the upper disk of the feed-yoke, and the valve-disk is dressed by revolving the spindle and feeding the same downward precisely as with the dressing of the valve-seat. As the inner or cutting edges of the disk-dressing tool are inclined to the same angle as the cutting edges of the inclined seat-cutting tool, it will be readily seen that when the two parts of the valve are again brought together after being operated upon they must of necessity form a perfect fitting.

By the employment of the V-shaped cutter it will be obvious that disks of varying diameter may be dressed without any adjustment of the cutter to compensate for various diameters. Vertical adjustment of the cutter when necessary is possible by moving the supporting-rods up or down through the opening therefor in the bar A, and the angles of the cutters may be changed by means of the set-screws and slots heretofore described. The wide range of vertical adjustment of the V-bar renders unnecessary any vertical adjustment of the spindle, and the obvious advantage of this is that the spindle can at all times, whether large or small valves are being dressed, be kept with its lower part supported by the bearings in the jaws. If, for instance, small valves were being dressed and the vertical adjustment were obtained only by moving the spindle, it will be seen that a large portion of the latter would be below the jaws, and hence unsupported. With my vertically-adjustable cutter-bar the vertical position of the spindle can remain the same whatever the diameter of the valve being dressed.

For holding or supporting the tool while dressing a disk, a rib or flange R is provided upon one of the members of the V-bar N, which is adapted to be clamped in a vise.

When a disk is to be dressed, the blocks D and D are moved together, so that the semicircular cavities $a^2$ in the lower parts thereof embrace and journal or support the spindle at such point and thus firmly hold the cutter from vibration or chattering.

By employing but the two blocks or jaws D and D, I not only have a simpler and cheaper machine than where a greater number, as four, are employed, but I am enabled to employ the double-thread feeding device and the take-up or wear-compensating gibs.

It is to be understood that while the particular specific features of construction of my machine as shown and described are considered the most desirable, the scope of my invention is not limited thereto, as changes in many respects can be made which will not involve change of principle.

What I claim is—

1. In a valve-dressing machine, the combination of the rotatable spindle, the bar, the two clamping-blocks slidingly mounted on the bar on opposite sides of the spindle, and the shaft having right-and-left threaded portions that engage correspondingly-threaded openings in the blocks, substantially as specified.

2. In a valve-dressing machine, the combination of the rotatable spindle, the bar journaling the same, the two blocks slidingly mounted on the bar on opposite sides of the spindle and having each valve-engaging projections on its under side, and the shaft having right-and-left threaded portions that respectively engage correspondingly-threaded openings in the blocks, substantially as specified.

3. In a valve-dressing machine the combination of the rotatable spindle, the bar extending at right angles to the spindle on diametrically opposite sides, and having inclined sides, the two blocks slidingly mounted on the bar having inclined portions to engage the sides of the bar, the adjustable gib between each block and the bar side, and the shaft having right-and-left threaded portions to engage, respectively, corresponding openings in the blocks, substantially as specified.

4. In a valve-dressing machine, the combination of the rotatable spindle, the bar through which the same passes having tubular extensions above and below, the two blocks on the bar having valve-engaging projections on their under sides and having each on its inner face a cavity to engage and journal the spindle, the double-threaded shaft for moving the blocks along the bar, and the adjustable gib between each block and the bar side, substantially as specified.

5. In a valve-dressing machine, the combination of a clamping device, the rotatable spindle, a work-holder on the spindle, the bar with inclined cutters on its sides extending in lines tangential to the spindle-axis, and the parallel vertical extensions of said bar adapted for vertical adjustment, substantially as specified.

In testimony whereof I affix my signature in presence of two witnesses.

ROYAL H. BENTON.

Witnesses:
G. H. CAIN,
CHAS. B. CASE.